(12) United States Patent
Abajian et al.

(10) Patent No.: US 9,009,136 B2
(45) Date of Patent: *Apr. 14, 2015

(54) METHODS AND SYSTEMS FOR ENHANCING METADATA

(75) Inventors: Aram Christian Abajian, Seattle, WA (US); Robin Andrew Alexander, Redmond, WA (US); Scott Chao-Chueh Lee, Bellevue, WA (US); Austin David Dahl, Seattle, WA (US); John Anthony Derosa, Seattle, WA (US); Charles A. Porter, Seattle, WA (US); Eric Carl Rehm, Bainbridge Island, WA (US); Jennifer Lynn Kolar, Seattle, WA (US); Srinivasan Sudanagunta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

This patent is subject to a terminal disclaimer.

(21) Appl. No.: 12/780,571

(22) Filed: May 14, 2010

(65) Prior Publication Data
US 2010/0287159 A1 Nov. 11, 2010

Related U.S. Application Data

(63) Continuation of application No. 10/886,946, filed on Jul. 7, 2004, now Pat. No. 7,720,836, which is a continuation of application No. 09/876,941, filed on Jun. 8, 2001, now Pat. No. 6,785,688.

(60) Provisional application No. 60/252,273, filed on Nov. 21, 2000.

(51) Int. Cl.
*G06F 17/30* (2006.01)

(52) U.S. Cl.
CPC ...... *G06F 17/30283* (2013.01); *G06F 17/3002* (2013.01); *G06F 17/30038* (2013.01);

(Continued)

(58) Field of Classification Search
CPC ............ G06F 17/3089; G06F 17/3071; G06F 2221/2101
USPC .......................... 707/723, 722, 769, 711.736
See application file for complete search history.

(56) References Cited

U.S. PATENT DOCUMENTS

| | | | |
|---|---|---|---|
| 5,241,305 A | 8/1993 | Fascenda et al. | |
| 5,339,434 A | 8/1994 | Rusis | |

(Continued)

FOREIGN PATENT DOCUMENTS

| | | |
|---|---|---|
| WO | WO-9722069 | 6/1997 |
| WO | WO-0068839 | 11/2000 |
| WO | WO-0133428 | 5/2001 |

OTHER PUBLICATIONS

Anne J. Gilliand-Swetland, Introduction to Metadata Setting the Stage, Jul. 5, 2000, pp. 1-11.

(Continued)

*Primary Examiner* — Hung T Vy
(74) *Attorney, Agent, or Firm* — Joann Dewey; Doug Barker; Micky Minhas

(57) ABSTRACT

A method and system for utilizing metadata to search for media, such as multimedia and streaming media, includes searching for the media, receiving results, extracting metadata associated with the media, enhancing the extracted metadata, and grouping the search results in accordance with attributes of the enhanced metadata. Enhancing and grouping include adding related metadata to the database of metadata, iteratively using metadata to search for more media related data, removing duplicate URLs, collapsing URLs that are variants of each other, and masking out superfluous terms from URLs. The resultant metadata and media files are available to users and search engines.

22 Claims, 11 Drawing Sheets

(52) U.S. Cl.
    CPC .... *G06F17/30053* (2013.01); *G06F 17/30864*
         (2013.01); *Y10S 707/99943* (2013.01); *Y10S*
             *707/99935* (2013.01); *Y10S 707/99933*
         (2013.01); *Y10S 707/99934* (2013.01); *Y10S*
             *707/99945* (2013.01); *Y10S 707/99948*
             (2013.01); *Y10S 707/959* (2013.01); *Y10S*
         *707/913* (2013.01); *Y10S 707/923* (2013.01)

(56) References Cited

U.S. PATENT DOCUMENTS

| | | | |
|---|---|---|---|
| 5,345,227 | A | 9/1994 | Fascenda et al. |
| 5,467,471 | A | 11/1995 | Bader |
| 5,483,522 | A | 1/1996 | Derby et al. |
| 5,491,511 | A | 2/1996 | Odle |
| 5,684,999 | A | 11/1997 | Okamoto |
| 5,761,436 | A | 6/1998 | Nielsen |
| 5,802,361 | A | 9/1998 | Wang et al. |
| 5,870,755 | A | 2/1999 | Stevens et al. |
| 5,875,332 | A | 2/1999 | Wang et al. |
| 5,892,843 | A | 4/1999 | Zhou et al. |
| 5,892,919 | A | 4/1999 | Nielsen |
| 5,895,471 | A | 4/1999 | King et al. |
| 5,907,837 | A | 5/1999 | Ferrel et al. |
| 5,915,001 | A | 6/1999 | Uppaluru |
| 5,917,424 | A | 6/1999 | Goldman et al. |
| 5,918,232 | A | 6/1999 | Pouschine |
| 5,920,854 | A | 7/1999 | Kirsch et al. |
| 5,920,856 | A | 7/1999 | Syeda-Mahmood |
| 5,920,859 | A | 7/1999 | Li |
| 5,924,116 | A | 7/1999 | Aggarwal et al. |
| 5,930,783 | A | 7/1999 | Li et al. |
| 5,935,210 | A | 8/1999 | Stark |
| 5,941,944 | A | 8/1999 | Messerly |
| 5,946,697 | A | 8/1999 | Shen |
| 5,953,718 | A | 9/1999 | Wical |
| 5,956,722 | A | 9/1999 | Jacobson et al. |
| 5,963,940 | A | 10/1999 | Liddy et al. |
| 5,974,409 | A | 10/1999 | Sanu et al. |
| 5,983,218 | A | 11/1999 | Syeda-Mahmood |
| 5,983,237 | A | 11/1999 | Jain et al. |
| 5,986,484 | A | 11/1999 | Rosenberg et al. |
| 5,987,466 | A | 11/1999 | Greer et al. |
| 5,991,756 | A | 11/1999 | Wu |
| 5,991,809 | A | 11/1999 | Kriegsman |
| 5,999,664 | A | 12/1999 | Mahoney et al. |
| 6,006,225 | A | 12/1999 | Bowman et al. |
| 6,006,242 | A | 12/1999 | Poole et al. |
| 6,006,264 | A | 12/1999 | Colby et al. |
| 6,009,271 | A | 12/1999 | Whatley |
| 6,012,126 | A | 1/2000 | Aggarwal et al. |
| 6,026,391 | A | 2/2000 | Osborn et al. |
| 6,026,413 | A | 2/2000 | Challenger et al. |
| 6,035,330 | A | 3/2000 | Astiz et al. |
| 6,038,561 | A | 3/2000 | Snyder et al. |
| 6,038,610 | A | 3/2000 | Belfiore et al. |
| 6,044,375 | A * | 3/2000 | Shmueli et al. ............. 1/1 |
| 6,055,543 | A | 4/2000 | Christensen et al. |
| 6,061,692 | A | 5/2000 | Thomas et al. |
| 6,065,058 | A | 5/2000 | Hailpern et al. |
| 6,067,552 | A | 5/2000 | Yu |
| 6,067,565 | A | 5/2000 | Horvitz |
| 6,081,774 | A | 6/2000 | de Hita et al. |
| 6,092,072 | A | 7/2000 | Guha et al. |
| 6,092,100 | A | 7/2000 | Berstis et al. |
| 6,092,118 | A | 7/2000 | Tsang |
| 6,094,684 | A | 7/2000 | Pallmann |
| 6,098,064 | A | 8/2000 | Pirolli et al. |
| 6,112,203 | A | 8/2000 | Bharat et al. |
| 6,128,627 | A | 10/2000 | Mattis et al. |
| 6,131,095 | A | 10/2000 | Low et al. |
| 6,134,548 | A | 10/2000 | Gottsman et al. |
| 6,138,113 | A | 10/2000 | Dean et al. |
| 6,138,162 | A | 10/2000 | Pistriotto et al. |
| 6,151,584 | A | 11/2000 | Papierniak et al. |
| 6,157,924 | A | 12/2000 | Austin |
| 6,173,287 | B1 | 1/2001 | Eberman et al. |
| 6,175,829 | B1 | 1/2001 | Li et al. |
| 6,175,830 | B1 | 1/2001 | Maynard |
| 6,181,336 | B1 | 1/2001 | Chiu et al. |
| 6,192,382 | B1 | 2/2001 | Lafer et al. |
| 6,208,988 | B1 | 3/2001 | Schultz |
| 6,225,995 | B1 | 5/2001 | Jacobs et al. |
| 6,240,416 | B1 | 5/2001 | Immon et al. |
| 6,249,844 | B1 | 6/2001 | Schloss et al. |
| 6,256,623 | B1 | 7/2001 | Jones |
| 6,275,820 | B1 | 8/2001 | Navin-Chandra et al. |
| 6,282,548 | B1 | 8/2001 | Burner et al. |
| 6,282,549 | B1 | 8/2001 | Hoffert et al. |
| 6,310,601 | B1 | 10/2001 | Moore et al. |
| 6,311,194 | B1 * | 10/2001 | Sheth et al. .................. 715/236 |
| 6,314,456 | B1 | 11/2001 | Van Andel et al. |
| 6,321,200 | B1 | 11/2001 | Casey |
| 6,327,574 | B1 | 12/2001 | Kramer et al. |
| 6,351,755 | B1 | 2/2002 | Najork et al. |
| 6,377,995 | B2 | 4/2002 | Agraharam et al. |
| 6,389,467 | B1 | 5/2002 | Eyal |
| 6,393,415 | B1 | 5/2002 | Getchius et al. |
| 6,411,724 | B1 | 6/2002 | Vaithilingam et al. |
| 6,411,952 | B1 | 6/2002 | Bharat et al. |
| 6,418,441 | B1 | 7/2002 | Call |
| 6,421,675 | B1 | 7/2002 | Ryan et al. |
| 6,424,966 | B1 | 7/2002 | Meyerzon et al. |
| 6,434,573 | B1 | 8/2002 | Jacobson et al. |
| 6,470,307 | B1 | 10/2002 | Turney et al. |
| 6,484,199 | B2 | 11/2002 | Eyal |
| 6,490,585 | B1 | 12/2002 | Hanson et al. |
| 6,493,720 | B1 | 12/2002 | Chu et al. |
| 6,498,897 | B1 | 12/2002 | Nelson et al. |
| 6,516,337 | B1 | 2/2003 | Tripp et al. |
| 6,519,564 | B1 | 2/2003 | Hoffberg et al. |
| 6,519,603 | B1 | 2/2003 | Bays et al. |
| 6,519,648 | B1 | 2/2003 | Eyal |
| 6,523,000 | B1 | 2/2003 | Ando et al. |
| 6,539,382 | B1 | 3/2003 | Byrne et al. |
| 6,547,829 | B1 | 4/2003 | Meyerzon et al. |
| 6,549,922 | B1 | 4/2003 | Srivastava et al. |
| 6,556,983 | B1 | 4/2003 | Altschuler et al. |
| 6,567,800 | B1 | 5/2003 | Barrera et al. |
| 6,584,468 | B1 | 6/2003 | Gabriel et al. |
| 6,587,127 | B1 | 7/2003 | Leeke et al. |
| 6,594,662 | B1 | 7/2003 | Sieffert et al. |
| 6,594,694 | B1 | 7/2003 | Najork et al. |
| 6,598,051 | B1 | 7/2003 | Wiener et al. |
| 6,605,120 | B1 | 8/2003 | Fields et al. |
| 6,638,317 | B2 | 10/2003 | Nakao et al. |
| 6,643,661 | B2 | 11/2003 | Polizzi et al. |
| 6,651,058 | B1 | 11/2003 | Sundaresan et al. |
| 6,654,749 | B1 | 11/2003 | Nashed |
| 6,658,402 | B1 | 12/2003 | Dutta |
| 6,675,174 | B1 | 1/2004 | Bolle et al. |
| 6,681,227 | B1 | 1/2004 | Kojima et al. |
| 6,711,590 | B1 | 3/2004 | Lennon et al. |
| 6,718,328 | B1 | 4/2004 | Norris |
| 6,760,721 | B1 | 7/2004 | Chasen et al. |
| 6,782,391 | B1 | 8/2004 | Scher |
| 6,782,427 | B1 | 8/2004 | Van Andel et al. |
| 6,785,688 | B2 | 8/2004 | Abajian et al. |
| 6,816,858 | B1 | 11/2004 | Coden et al. |
| 6,819,339 | B1 | 11/2004 | Dowling |
| 6,842,761 | B2 | 1/2005 | Diamond et al. |
| 6,847,977 | B2 | 1/2005 | Abajian |
| 6,859,213 | B1 | 2/2005 | Carter |
| 6,865,593 | B1 | 3/2005 | Reshef et al. |
| 6,877,002 | B2 | 4/2005 | Prince |
| 6,895,402 | B1 | 5/2005 | Emens et al. |
| 6,931,397 | B1 | 8/2005 | Sundaresan |
| 6,938,034 | B1 | 8/2005 | Kraft et al. |
| 6,941,300 | B2 | 9/2005 | Jensen-Grey |
| 6,959,326 | B1 | 10/2005 | Day et al. |
| 6,981,002 | B2 | 12/2005 | Nunez |
| 7,080,064 | B2 | 7/2006 | Sundaresan |
| 7,162,691 | B1 * | 1/2007 | Chatterjee et al. ............ 715/205 |
| 7,181,444 | B2 | 2/2007 | Porter et al. |

(56) References Cited

U.S. PATENT DOCUMENTS

| | | | |
|---|---|---|---|
| 7,185,003 | B2 | 2/2007 | Bayliss et al. |
| 7,325,145 | B1 | 1/2008 | England |
| 7,353,246 | B1 | 4/2008 | Rosen et al. |
| 7,630,986 | B1 * | 12/2009 | Herz et al. ............... 1/1 |
| 7,813,944 | B1 | 10/2010 | Luk et al. |
| 2001/0044719 | A1 | 11/2001 | Casey |
| 2002/0002541 | A1 | 1/2002 | Williams |
| 2002/0010798 | A1 | 1/2002 | Ben-Shaul et al. |
| 2002/0024532 | A1 | 2/2002 | Fables et al. |
| 2002/0035573 | A1 | 3/2002 | Black et al. |
| 2002/0052928 | A1 | 5/2002 | Stern et al. |
| 2002/0059184 | A1 | 5/2002 | Ilan et al. |
| 2002/0078003 | A1 | 6/2002 | Krysiak et al. |
| 2002/0078014 | A1 | 6/2002 | Pallmann |
| 2002/0099700 | A1 | 7/2002 | Li |
| 2002/0099731 | A1 | 7/2002 | Abajian |
| 2002/0099737 | A1 | 7/2002 | Porter et al. |
| 2002/0103920 | A1 | 8/2002 | Berkun et al. |
| 2002/0138467 | A1 | 9/2002 | Jacobson et al. |
| 2002/0174147 | A1 | 11/2002 | Wang et al. |
| 2003/0028654 | A1 | 2/2003 | Abjanic et al. |
| 2004/0030681 | A1 | 2/2004 | Shannon et al. |
| 2004/0030683 | A1 | 2/2004 | Evans et al. |
| 2004/0064500 | A1 | 4/2004 | Kolar et al. |
| 2005/0177568 | A1 | 8/2005 | Diamond et al. |
| 2005/0187965 | A1 | 8/2005 | Abajian |
| 2005/0193014 | A1 | 9/2005 | Prince |
| 2007/0130131 | A1 | 6/2007 | Porter et al. |

OTHER PUBLICATIONS

Eberman, et al., Compaq, Indexing Multimedia for the Internet, Cambridge Research Laboratory, Mar. 1999.

Eric Rehm, Representing Internet Streaming Media Metadata Using MPEG-7 Multimedia Description Schemes, Jul. 2, 2000, pp. 1-14.

John R. Smith & Shih-Fu Chang, Visually Searching the Web for Content, Jul.-Sep. 1997, pp. 12-20.

Kontothanassis, et al., Compaq, Design, Implementation, and Analysis of a Multimedia Indexing and Delivery Server, Cambridge Research Laboratory, Aug. 1999.

Max Chittister, Oracle InterMedia Annotator User's Guide, Release 1.5, 1999, 2000 Oracle Corporation.

Network Working Group, Dublin Core Metadata for Resource Discovery, Sep. 1998, pp. 1-10.

Taalee Semantic Engine Brochure.

Bowman, et al. "The Harvest Information Discovery and Access System", *Computer Networks and ISDN Systems*, North Holland Publishing vol. 28, No. 1, pp. 119-125, Dec. 1995.

European Supplemental Search Report; European Patent Application No. 01 988 143.2; Filed Nov. 20, 2001; Applicant: Thomas Licensing S.A., Mailed Dec. 28, 2004, 2 pages.

European Supplemental Search Report; European Patent Application No. 01 988 150.7; Filed Nov. 20, 2001; Applicant: Thomas Licensing S.A., Mailed Dec. 28, 2004, 3 pages.

Fiedler, et al., "Using the Web Efficiently: Mobile Crawlers", 17th Annual International Conference of the Association of Management on Computer Science, p. 324-329, Aug. 1999.

International Search Report; International Patent Application No. PCT/US01/43305; Filed Nov. 20, 2001; Applicants: Kolar et al., Mailed Sep. 9, 2002, 2 pages.

International Search Report; International Patent Application No. PCT/US01/43247; Filed Nov. 20, 2001; Applicant: Singfish.com, Mailed Apr. 18, 2008, 2 pages.

International Search Report; International Patent Application No. PCT/US01/43303; Filed Nov. 20, 2001; Applicant: Singfish.com, Mailed May 15, 2002, 3 pages.

International Search Report; International Patent Application No. PCT/US01/43248; Filed Nov. 20, 2001; Applicant: Singfish.com, Mailed May 30, 2002, 2 pages.

Koster, "Robots in the Web: Threat or Treat?" Available at http://www.robotstxt.org/wc/threat-or-treat.html, Apr. 1995.

Mauldin, "Lycos: Design Choices in an Internet Search Service," *IEEE Expert IEEE USA*, vol. 12, No. 1, Jan. 1997, pp. 8-11, IEEE USA.

Podlipnig et al. "A Survey of Web Cache Replacement Strategies", ACM Computing Surveys, vol. 35, No. 4, Dec. 2003, pp. 374-398.

U.S. Appl. No. 60/208,954, filed May 31, 2000; 7 pages.

U.S. Appl. No. 60/221,750, filed Aug. 31, 2003; 112 pages.

Swain, "Searching for Multimedia on the World Wide Web", Cambridge Research Library, Technical Report Series, Mar. 1999, 14 pages.

"Non Final Rejection Issued in co-pending U.S. Appl. No. 11/054,701 ", Oct. 15, 2014, 19 Pages, United States.

* cited by examiner

METHODS AND SYSTEMS FOR ENHANCING METADATA

CROSS-REFERENCE TO RELATED APPLICATIONS

This is a continuation and claims the benefit of priority of U.S. patent application Ser. No. 10/886,946, filed Jul. 7, 2004 now U.S. Pat. No. 7,720,836 (now allowed), which is a continuation of U.S. patent application Ser. No. 09/876,941, filed Jun. 8, 2001 (issued as U.S. Pat. No. 6,785,688), which claims the benefit of priority of U.S. Provisional Patent Application No. 60/252,273, filed Nov. 21, 2000, the entire contents of all of which are incorporated herein by reference.

FIELD OF THE INVENTION

The present invention relates to computer related information search and retrieval, and specifically to multimedia and streaming media search tools.

BACKGROUND

An aspect of the Internet (also referred to as the World Wide Web, or Web) that has contributed to its popularity is the plethora of multimedia and streaming media files available to users. However, finding a specific multimedia or streaming media file buried among the millions of files on the Web is often an extremely difficult task. The volume and variety of informational content available on the web is likely continue to increase at a rather substantial pace. This growth, combined with the highly decentralized nature of the web, creates substantial difficulty in locating particular informational content.

Streaming media refers to audio, video, multimedia, textual, and interactive data files that are delivered to a user's computer via the Internet or other network environment and begin to play on the user's computer before delivery of the entire file is completed. One advantage of streaming media is that streaming media files begin to play before the entire file is downloaded, saving users the long wait typically associated with downloading the entire file. Digitally recorded music, movies, trailers, news reports, radio broadcasts and live events have all contributed to an increase in streaming content on the Web. In addition, less expensive high-bandwidth connections such as cable, DSL and T1 are providing Internet users with speedier, more reliable access to streaming media content from news organizations, Hollywood studios, independent producers, record labels and even home users themselves.

A user typically uses a search engine to find specific information on the Internet. A search engine is a set of programs accessible at a network site within a network, for example a local area network (LAN) or the Internet and World Wide Web. One program, called a "robot" or "spider", pre-traverses a network in search of documents (e.g., web pages) and builds large index files of keywords found in the documents. Typically, a user formulates a query comprising one or more search terms and submits the query to another program of the search engine. In response, the search engine inspects its own index files and displays a list of documents that match the search query, typically as hyperlinks. The user then typically activates one of the hyperlinks to see the information contained in the document.

Search engines, however, have drawbacks. For example, many typical search engines are oriented to discover textual information only. In particular, they are not well suited for indexing information contained in structured databases (e.g. relational databases), voice related information, audio related information, multimedia, and streaming media, etc. Also, mixing data from incompatible data sources is difficult for conventional search engines.

Another disadvantage of conventional search engines is that irrelevant information is aggregated with relevant information. For example, it is not uncommon for a search engine on the web to locate hundreds of thousands of documents in response to a single query. Many of those documents are found because they coincidentally include the same keyword in the search query. Sifting through search results in the thousands, however, is a daunting task. For example, if a user were looking for a song having the title "I Am The Walrus," the search query would typically contain the word "walrus." The list of hits would include documents providing biological information on walruses, etc. Thus, the user would have to review an enormous number of these hits before finally (if ever) reaching a hit related to the desired song title. Adding to a user's frustration is the possibility that many of the search results are duplicates and/or variants of each other, leading to the same document (e.g. uniform resource locator, URL). Further difficulty occurs in trying to evaluate the relative merit or relevance of concurrently found documents. The search for specific content based on a few key words will almost always identify documents whose individual relevance is highly variable.

Thus, there is a need for an automated media search tool that provides information to a user that overcomes the previously described drawbacks and disadvantages.

SUMMARY OF THE INVENTION

A method and system for searching for media on a computer network utilizes metadata. The media are searched for using at least one search term. Metadata associated with the media are extracted from the search results. This extracted metadata is enhanced. The search results are grouped into group(s), wherein extracted metadata associated with search results in a group have at least one common attribute. The method and system provide the media and/or the media uniform resource locator (URL).

BRIEF DESCRIPTION OF THE DRAWINGS

The above and other advantages and features of the present invention will be better understood from the following detailed description of the preferred embodiments of the invention, which is provided in connection with the accompanying drawings. The various features of the drawings may not be to scale. Included in the drawing are the following figures.

DETAILED DESCRIPTION

Figure 1:
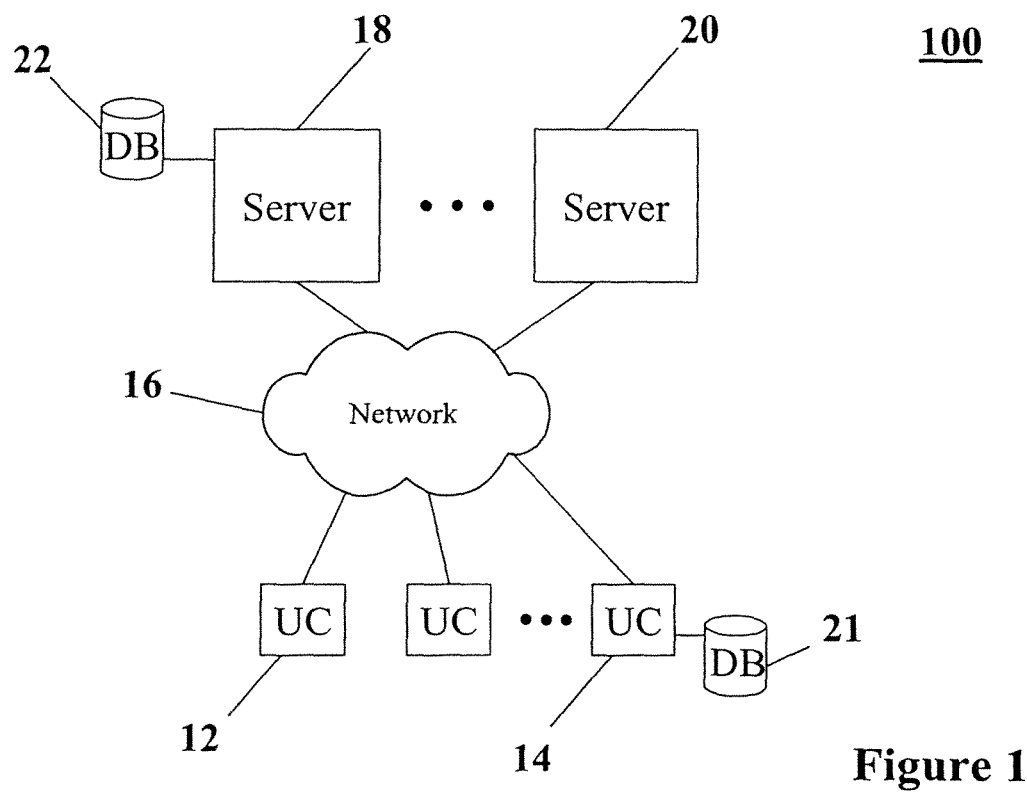
FIG. 1 is a block diagram of a computer system in accordance with an exemplary embodiment of the present invention.

Although the invention is described in terms of exemplary embodiments, it is not limited thereto. Rather, the appended claims should be construed broadly, to include other variants and embodiments of the invention, which may be made by those skilled in the art without departing from the scope and range of equivalents of the invention.

The present invention is a system and method for retrieving media files and data related to media files on a computer network via a search system utilizing metadata. As used herein, the term "media file" includes audio, video, textual, multimedia data files, and streaming media files. Multimedia files comprise any combination of text, image, video, and audio data. Streaming media comprises audio, video, multimedia, textual, and interactive data files that are delivered to a user's computer via the Internet or other communications network environment and begin to play on the user's computer/device before delivery of the entire file is completed. One advantage of streaming media is that streaming media files begin to play before the entire file is downloaded, saving users the long wait typically associated with downloading the entire file. Digitally recorded music, movies, trailers, news reports, radio broadcasts and live events have all contributed to an increase in streaming content on the Web. In addition, the reduction in cost of communications networks through the use of high-bandwidth connections such as cable, DSL, T1 lines and wireless networks (e.g., 2.5G or 3G based cellular networks) are providing Internet users with speedier, more reliable access to streaming media content from news organizations, Hollywood studios, independent producers, record labels and even home users themselves.

Examples of streaming media include songs, political speeches, news broadcasts, movie trailers, live broadcasts, radio broadcasts, financial conference calls, live concerts, web-cam footage, and other special events. Streaming media is encoded in various formats including REALAUDIO®, REALVIDEO®, REALMEDIA®, APPLE QUICKTIME®, MICROSOFT WINDOWS® MEDIA FORMAT, QUICKTIME®, MPEG-2 LAYER III AUDIO, and MP3®. Typically, media files are designated with extensions (suffixes) indicating compatibility with specific formats. For example, media files (e.g., audio and video files) ending in one of the extensions, .ram, .rm, .rpm, are compatible with the REALMEDIA® format. Some examples of file extensions and their compatible formats are listed in the following table. A more exhaustive list of media types, extensions and compatible formats may be found at http://www.bowers.cc/extensions2.htm.

| Format | Extension |
| --- | --- |
| REALMEDIA ® | .ram, .rm, .rpm |
| APPLE QUICKTIME ® | .mov, .qif |
| MICROSOFT WINDOWS ® MEDIA PLAYER | .wma, .cmr, .avi |
| MACROMEDIA FLASH | .swf, .swl |
| MPEG | .mpg, .mpa, .mp1, .mp2 |
| MPEG-2 LAYER III Audio | .mp3, .m3a, .m3u |

Metadata, literally means "data about data." Metadata is data that comprises information that describes the contents or attributes of other data (e.g., media file). For example, a document entitled, "Dublin Core Metadata for Resource Discovery," (http://www.ietf.org/rfc/rfc2413.txt) separates metadata into three groups, which roughly indicate the class or scope of information contained therein. These three groups are: (1) elements related primarily to the content of the resource, (2) elements related primarily to the resource when viewed as intellectual property, and (3) elements related primarily to the instantiation of the resource. Examples of metadata falling into these groups are shown in the following table.

| Content | Intellectual Property | Instantiation |
| --- | --- | --- |
| Title | Creator | Date |
| Subject | Publisher | Format |
| Description | Contributor | Identifier |
| Type | Rights | Language |
| Source | | |
| Relation | | |
| Coverage | | |

Sources of metadata include web page content, uniform resource locators (URLs), media files, and transport streams used to transmit media files. Web page content includes HTML, XML, metatags, and any other text on the web page. As explained in more detail, herein, metadata may also be obtained from the URLs the web page, media files, and other metadata. Metadata within the media file may include information contained in the media file, such as in a header or trailer, of a multimedia or streaming file, for example. Metadata may also be obtained from the media/metadata transport stream, such as TCP/IP (e.g., packets), ATM, frame relay, cellular based transport schemes (e.g., cellular based telephone schemes), MPEG transport, HDTV broadcast, and wireless based transport, for example. Metadata may also be transmitted in a stream in parallel or as part of the stream used to transmit a media file (a High Definition television broadcast is transmitted on one stream and metadata, in the form of an electronic programming guide, is transmitted on a second stream).

FIG. 1 is a block diagram illustrating a system, generally designated 100, in accordance with an exemplary embodiment of the present invention. The system 100 includes a plurality of server computers 18, 20, a plurality of user computers 12, 14, and a plurality of databases 21, 22. The server computers 18, 20 and the user computers 12, 14 may be connected by a network 16, such as for example, an Intranet or the Internet. The user computers 12, 14 may be connected to the Intranet or Internet by a modem connection, a Local Area Network (LAN), cable modem, digital subscriber line (DSL), or other equivalent coupling means. Alternatively, the computers communicate through a communications network by a cable, twisted pair, wireless based interface (cellular, infrared, radio waves) or equivalent connection utilizing data signals. Databases 21, 22 may be connected to the user computers and the server computers by any means known in the art. Databases may take the form of any appropriate type of memory (e.g., magnetic, optical, etc.). Databases 21, 22 may be external memory or located within the server computer or the user computer. Each user computer 12, 14 preferably includes a video display device for displaying information and a browser program (e.g. MICROSOFT INTERNET EXPLORER®, NETSCAPE NAVIGATOR®, etc.), as is well known in the art.

Computers may also encompass computers embedded within consumer products and other computers. For example, an embodiment of the present invention may comprise computers (as a processor) embedded within a television, a set top box, an audio/video receiver, a CD player, a VCR, a DVD player, a multimedia enable device (e.g., telephone), and an Internet enabled device.

In an exemplary embodiment of the invention, the server computers 18, 20 include one or more program modules and one or more databases which allow the user computers 12, 14 to communicate with the server computer, and each other, over the network 16. The program module(s) of the server computers 18, 20 include program code, written in PERL, Extensible Markup Language (XML), Java, Hypertext Markup Language (HTML), or any other equivalent language which allows the user computers 12, 14 to access the program module(s) of the server computer through the browser programs stored on the user computers. Although only two user computers 12, 14, two server computers 18, 20, and two databases 21, 22 are labeled in FIG. 1, those of ordinary skill in the art will realize that the system 100 may include any number of user computers, server computers, and databases.

Figure 2:
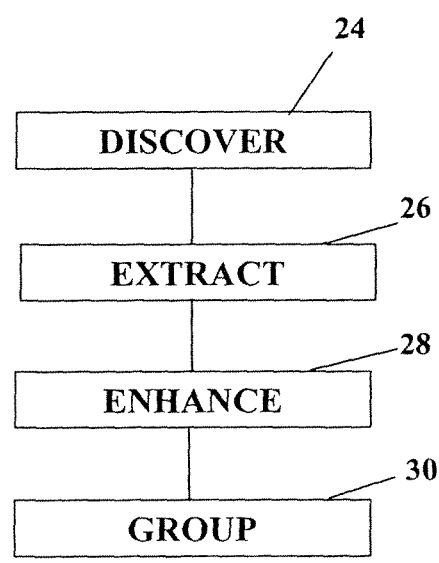
FIG. 2 is a flow diagram of an exemplary search and retrieval process in accordance with the present invention.

In an exemplary embodiment of the present invention, media files and related metadata are searched for and retrieved by reading, extracting, enhancing, and grouping metadata describing the contents of files. FIG. 2 is a flow diagram of an exemplary search and retrieval process in accordance with the present invention. Discovery (step 24) comprises an automated process referred to as a spider or web crawler, for searching web sites or data available through a communications network. Each web site may comprise any number of web pages and/or data on storage devices (hard drives, flash cards, disc drives, optical disc storage). The spider utilizes predetermined algorithms to continuously search for media files on web pages and file directories at each searched web site. The spider also searches each web site for links to other web sites, unique streams, and downloadable files.

Upon finding a media file, metadata associated with that file is extracted (step 26). Metadata is extracted from sources such as the name of the media file, the MIME responses, links to the media file, text surrounding the media file on the website, metatags (descriptive information embedded in sources as program code or HTML) in or surround the media file, content partners supplying metadata about their files, and the results of reading the metadata of the media file with an interpretive extraction process.

Extracted metadata is enhanced in step 28. The extracted metadata associated the media files are stored in memory (e.g., transferred to a database). The metadata is assessed, analyzed, and organized in accordance with attributes associated with the media file. If metadata information is missing from the extracted metadata, it is added (step 28). If metadata information is incorrect, it is corrected (step 28). For example, if metadata associated with a song comprises the fields of Composer, Title, Musician, Album Name, and Music Genre, but is missing the date the song was copyrighted, the copyright date is added to the extracted metadata. The metadata (e.g., copyright date) used to enhance the extracted metadata is obtained from at least one of several sources. These sources include a baseline database of metadata associated with the search target (e.g., the particular song of interest) and the semantic and technical relationships between the fields in the extracted metadata.

The extracted metadata, which may be enhanced, is categorized in accordance with specific metadata attributes in step 30. At this point the links, e.g., uniform resource indicators (URIs) in the form of uniform resource locators (URLs) for web pages and data files, may be transferred to the user, the URL of the media file may be transferred to the user, or the categorized metadata may be used (e.g., transferred to a search engine) to search and retrieve the target media file. In an exemplary embodiment of the invention, the target streaming media stream automatically starts playing. For example, a specific song is searched for, and the ultimate result is the playing of the song on the user's computer system.

Uniform resource indicators (URIs) are a universal set of names that refer to existing protocols or name spaces that identify resources (e.g., website, streaming media server), services (e.g., videos on demand, internet radio), devices (e.g., mobile phone, internet enable appliance), and data files (e.g., media files and text documents). A URL is a form of a URI that expresses an address that maps to an access algorithm using network protocols (e.g., TCP/IP or a MPEG transport scheme). When a URL is used, a specific resource, service, device, or data file may be accessed and/or manipulated. An alternative form of a URI known as an Internet protocol number or address (IP) is a series of numbers that refers to a specific resource, service, or data file. Optionally, a URL is mapped to an IP number, which provides two ways to access a desired resource (e.g., a resource is accessed either by using www.whitehouse.gov or the IP address 198.137.240.91).

Figure 3:
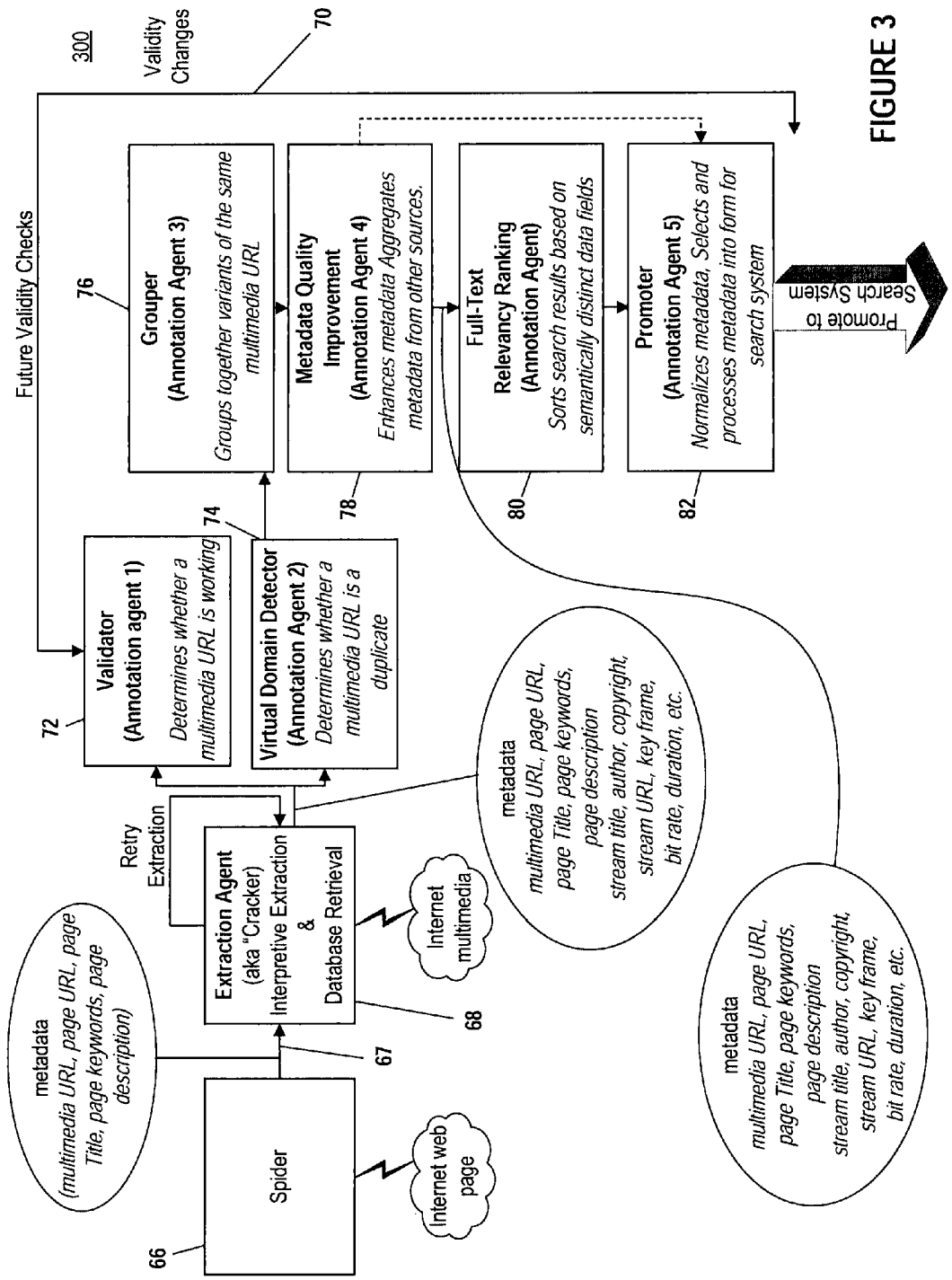
FIG. 3 is a functional block diagram of an exemplary multimedia and/or streaming media metadata search, retrieval, and enhancement system in accordance with the present invention.

FIG. 3 is a functional block diagram of an exemplary search and retrieval system, designated 300, in accordance with the present invention. System 300 comprises a plurality of autonomous, interacting agents for collecting, extracting, enhancing, and grouping media metadata. Although system 300 depicts the agents performing in an exemplary order, agents may perform respective functions in any order. Each agent receives and provides data from and to data queues. Data residing on a data queue is available to all agents. In an exemplary embodiment of the invention, media files and associated metadata are stored in memory (e.g., a database) and assigned an identifier (id). The ids are enqueued, and the agents receive and provide the ids from and to the queues. Agents retrieve associated data (e.g., metadata) from memory to perform various functions, and store the processed data in memory (e.g., update the database).

Figure 4:
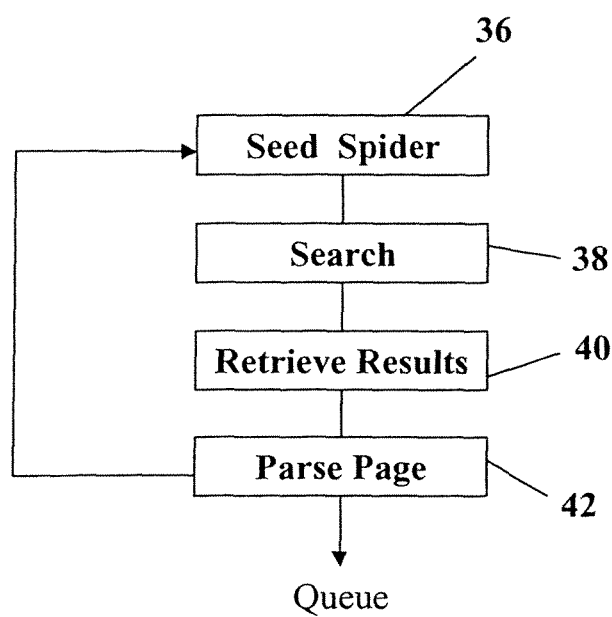
FIG. 4 is a flow diagram of an exemplary spider seeding process in accordance with the present invention.

Spider 66 incorporates a process of seeding to search for media and related files. FIG. 4 is a flow diagram of an exemplary spider seeding process in accordance with the present invention. The spider is seeded in step 36. The spider seeds its search by adding terms that are related to the query being used to index media. Additionally, the spider adds media related terms to the search, such as "MP3" and "RealAudio". Adding media related terms to the search tend to limit the search to media related files and URIs (in the form of links). For example, adding streaming media related terms to the search tends to limit the search to streaming media related files and links. The spider receives the search results and uses the links to perform more searches. The input queue of the spider may be seeded with several types of information, such as the results of querying other search engines, manually generated sets of web page URLs, and processing proxy cache logs (i.e., web sites that other users have accessed).

The spider uses seed URLs to search (step 38) and retrieve (step 40) the HTML text from located web sites. The file name and MIME type of the web site are stored in memory. The text is parsed to look for links to other web resources associated with media in step 42. The HTML code of each web page is examined for anchor tags, form elements, known JavaScript functions, etc., to find other web resources associated with media. These newly found web resources are used as seeds for the spider for additional searches (added to the spider input queue) by repeating steps 36 through 42 using the new seeds.

Referring again to FIG. 3, the parsed results (from step 42 in FIG. 4) relating to the media are passed to extraction agent 68 via an extraction queue 67. Results not associated with the media are not pursued. The extraction queue 67 comprises URLs to be analyzed with respect to associated media metadata. The extraction queue 67 may comprise metadata queue entries such as media URLs, Web page URLs, Web page titles, Web page keywords, Web page descriptions, media title, media author, and media genre. Each queue entry added to the extraction queue is assigned a processing time and a priority. In an exemplary embodiment of the invention, each queue entry is given a processing time of "now" and the same default priority. The iterative seeding process increases the number of queue entries added to the extraction queue 67.

Figure 5:
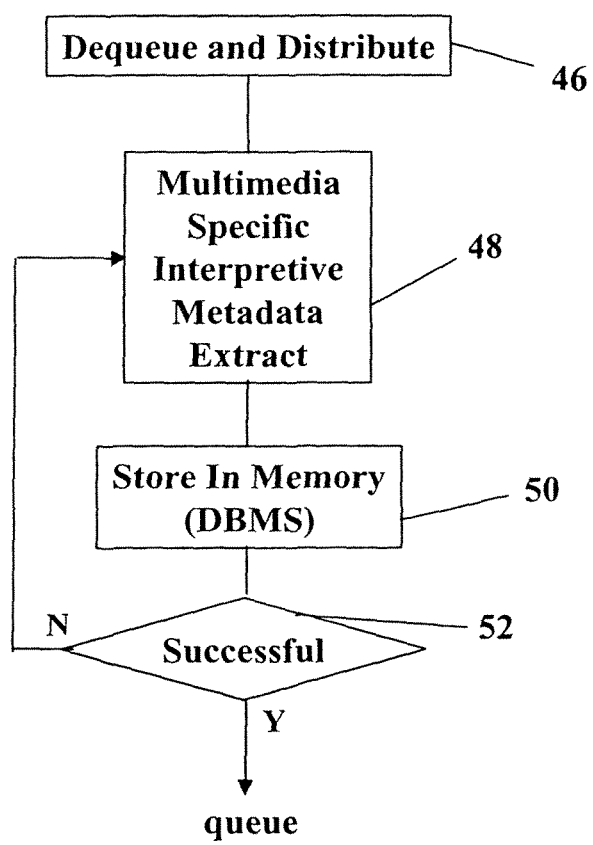
FIG. 5 is a flow diagram of an exemplary distribution and extraction process in accordance with the present invention.

The extraction agent 68 comprises an interpretive metadata extractor and a database retriever. The extraction agent 68 distributes and performs enhanced metadata extraction of queue entries on the extraction queue 67. FIG. 5 is a flow diagram of an exemplary distribution and extraction process in accordance with the present invention. Queue entries contained in the extraction queue 67 are dequeued and distributed to media specific extractors in step 46. The extraction queue entries are dequeued and distributed in priority and time order. Preferably, the file extension, MIME type, and/or file identification for each queue entry is examined to determine the type of media format. The queue entry is than sent to the appropriate media specific extractor. Optionally, other types of data are used to determine the media format of a file (for example, the extraction queue 67 reads the metadata embedded in a media file to determine that it is a Real Media video file).

In step 48, queue entries sent to a specific media extractor are extracted by that specific extractor. Metadata extraction comprises the process of extracting metadata from the media file or from related media content (e.g., from the referring web page). Types of media specific extractors include multimedia and streaming extractors that can extract metadata from formats such as REALAUDIO®, REALVIDEO®, REALMEDIA®, APPLE QUICKTIME®, MICROSOFT WINDOWS® MEDIA FORMAT, QUICKTIME®, MPEG-2 LAYER III AUDIO, and MP3®, for example. As discussed in more detail herein, interpretive metadata extraction captures and aggregates metadata pertaining to a media file using metadata from the media stream, third party databases, the referring web page, and the URL, and replaces inaccurate metadata with known good metadata. An Internet stream object is created comprising the media file from the URL, metadata extracted from the media file and an identifier (id). The Internet stream object is automatically stored in memory (step 50). In an exemplary embodiment of the invention, memory storage comprises providing the object to a relational database management system (DBMS) for storage and database management.

In step 52, it is determined if the accessible media file and the associated metadata links are valid. Validation comprises determining if the Web page comprises a link to a desired media file, and also determining if the desired media file works. In an exemplary embodiment of the invention, a streaming media file is retrieved and played to determine it is valid. If determined to be invalid (not successful in step 52), the Internet stream object is assigned a later time and priority. The Internet stream object is requeued to the extractor, and steps 48 through 50 are repeated with at the later time and in accordance with the newly assigned priority. If extraction is valid (successful in step 52), the Internet streaming object is queued and available to all agents.

Figure 6:
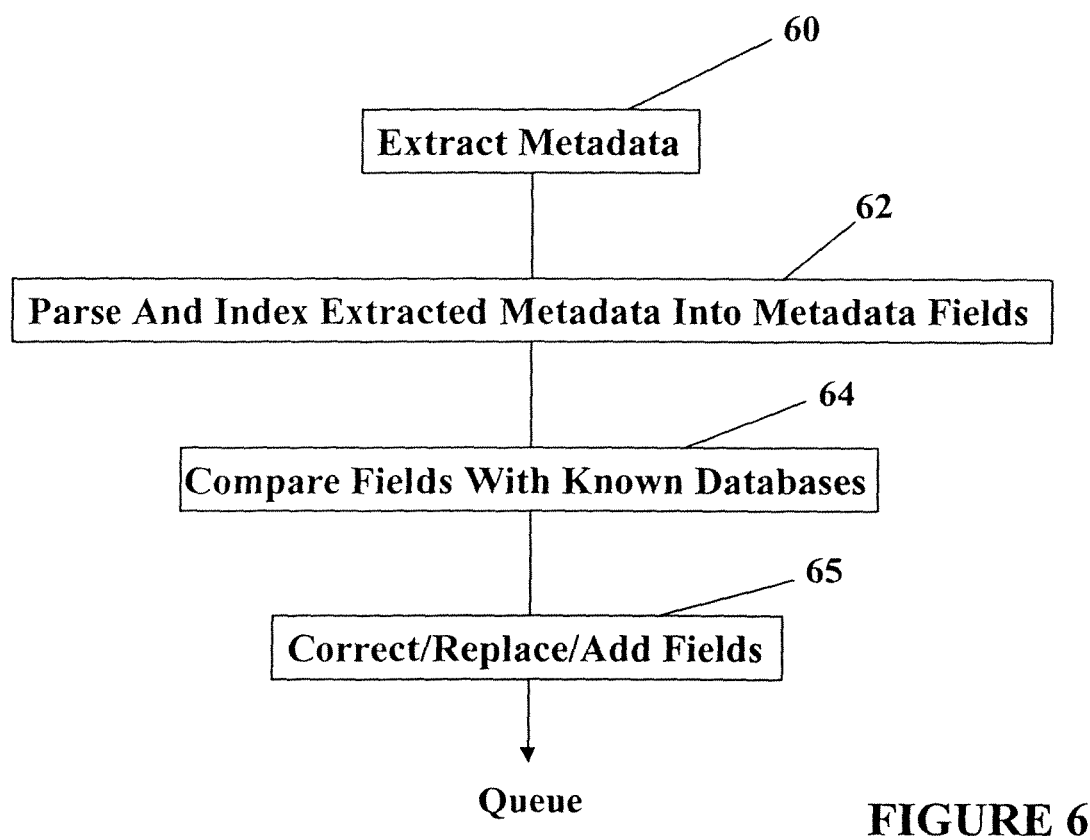
FIG. 6 is a flow diagram of an exemplary interpretive metadata extraction and database retrieval process in accordance with the present invention.

Extraction agent 68 captures and aggregates media specific metadata pertaining to the media (including multimedia and streaming media) from sources such as the media URL, the referring Web page URL, title, key words, description, and third party databases. FIG. 6 is a flow diagram of an exemplary interpretive metadata extraction and database retrieval process in accordance with the present invention. Metadata, which may be inaccurate or "noisy," is extracted (step 60), parsed and indexed (step 62), compared with fields in known databases (step 64), and replaced (step 65) with accurate metadata obtained from a valid (ground truth) database. Metadata is indexed and parsed into metadata fields (step 62) and compared to other databases (step 64), such as a music or movie database, whose accuracy is known (ground truth databases). Ground truth databases may be obtained from sources such as third party databases, previously created databases, and user entered databases, for example. Noisy fields are corrected and/or replaced with accurate data (step 65). New fields are added if appropriate (step 65).

For example, assume the spider 66 finds a media file containing a music song. The metadata is extracted by extracting agent 68, and parsed and indexed into the following metadata fields: the referring URL, the media URL, the title, and the performer of the song. The information contained in these fields is as follows.

| FIELD | CONTENTS |
| --- | --- |
| The referring URL | www.singingfish.com/index.html |
| Media URL | www.singingfish.com/foobar.RAW |
| Title | "I am the Fishman" |
| Performer | Paul McCarpney |

The metadata fields are compared to a known database, such as a third party database, to compare contents of the metadata fields with the contents of the fields in the known database. In this example, assume a known database is located and contains the following indexed metadata.

| FIELD | CONTENTS |
| --- | --- |
| Copyright | 1984 |
| Title | "We are the Fishmen" |
| Album | Rubber Suit |
| Music Genre | Light Rock |
| Performer | John Lennon |
| Performer | Paul McCarpney |

The interpretive extraction agent 68, adds the missing fields corresponding to the copyright, album, music genre, and composer, and adds the additional performer (i.e., John Lennon). The interpretive extraction 68 also corrects the title of the song from "I am the Fishman" to "We are the Fishmen" because the database comprises valid or authoritative metadata. Thus, prior to these enhancements, this media file could only be located if a user enter "Paul McCarpney" as the performer and/or "I am the Fishman" as the title. As a result of the enhancements provided by the interpretive metadata extraction agent 68, a user may locate this media file also by searching for any of the resultant fields (e.g., the album name or the composer).

Figure 7:
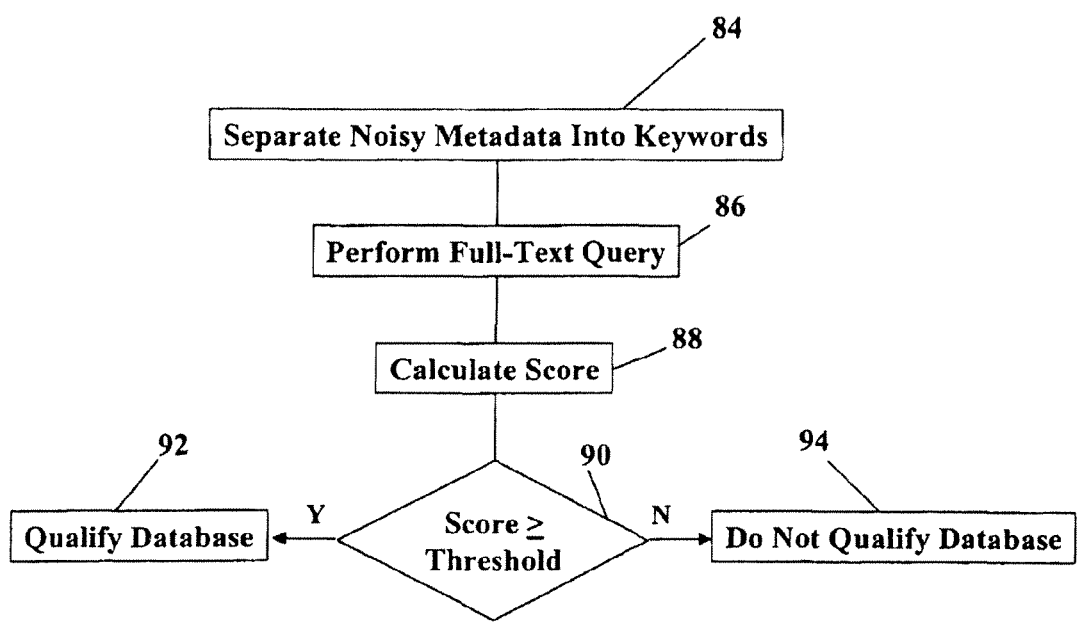
FIG. 7 is a flow diagram of an exemplary process for querying databases in accordance with the present invention.

Not all databases queried are determined to be ground truth databases. FIG. 7 is a flow diagram of an exemplary process for querying databases in accordance with the present invention. Noisy metadata (metadata that needs to be cleaned up before being processed) are compared to potential ground truth databases to determine if a potential ground truth database qualifies as a ground truth database. In step 84, noisy metadata in each field (e.g., artist, title, album) is separated into keywords by transforming any connecting characters into white space. For example, "oops_i_did_it_again" is transformed to the cleaned up "oops i did it again". Connecting characters may include, for example, period ("."), underscore ("_"), backslash ("\"), forward slash ("/"), comma (","), asterisk ("*"), hyphen ("-"), and/or any other appropriate connecting character. The fields in the noisy metadata are used to perform a full-text query against one or more fields in the potential ground truth databases (step 86).

A score is calculated, in step 88, to quantify the degree of similarity between the noisy data (candidate metadata) and potential ground truth data (valid metadata). In an exemplary embodiment of the invention, the number of matching keywords in the fields being compared determines a score. For example, if the input query is "oops i did it" and two potential ground truth data records are "oops i did it again" and "did it again for you", the first score is 4 and the second score is 2. In an alternate embodiment of the invention, fields are also assigned weights, which are multiplied by the number of matching keywords. For example, the artist field may be assigned a weight of 3, and the copyright date field may be assigned a weight of 1. Thus, if two keywords match in each of the artist and copyright fields, the score for the artist field is 6, and the score for the copyright field is 2. Further, individual field scores may be added, averaged, or combined by any appropriate means to derive a cumulative database score. The scores are compared to a threshold value (step 90) to determine if the potential ground truth database qualifies (step 92), or does not qualify (step 94) as a ground truth database. If a database qualifies as a ground truth database, it is used by the interpretive extraction process as described herein. The threshold value may be predetermined and constant, or may be adaptively determined in accordance with the range of calculated scores.

Referring again to FIG. 3, the validator 72 dequeues entries from the queue in time and priority order. The validator 72 validates the media data by determining if the Web page comprises a link to a desired media file and also determining if the desired media file works. Validation is performed at a future point in time (e.g., check if the URL is still alive in 3 days), or alternatively, at periodic future points in time. If validity changes from valid to invalid, a notification is sent to promoter 82, as indicated by arrow 70. Validity may change from valid to invalid, for example, if the media file was removed from the linking URL.

The virtual domain detector 74 dequeues data from the queue in time and priority order. The virtual domain detector 74 looks for duplicate domains (field of the URL). If duplicates are found, they are identified as such and queued. The queued ids are available to all agents.

It is not uncommon for Web pages and multiple servers with different portions of a URL, e.g., different domains, to host the same media content. Further, the same media content may be available in different formats and bit rates. The grouper 76 analyzes and compares URLs in the database. The grouper 76 combines variants of the same media URL and creates a group in which all metadata for similar URLs are added to the group. URLs are analyzed to determine if they are variations of related files. For example, if two URLs share a very complex path that differs only in the file extension, the two URLs are considered to be related. Differences are eliminated by masking out tokens at the same relative location with respect to the original string.

Figure 8:
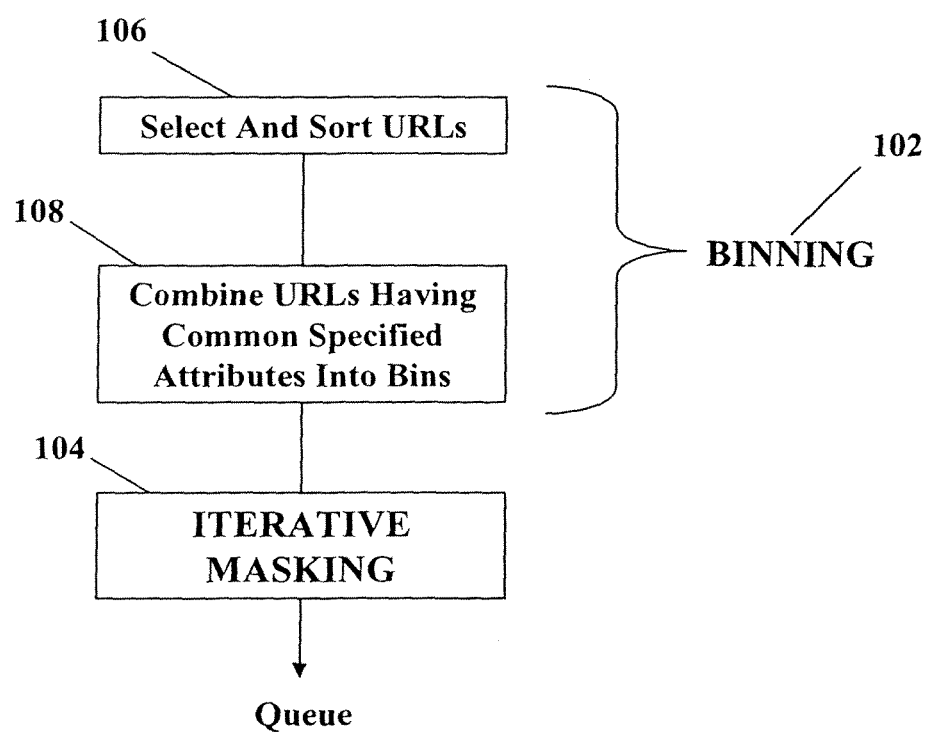
FIG. 8 is a flow diagram of an exemplary grouping process in accordance with the present invention.

FIG. 8 is a flow diagram of an exemplary grouping process in accordance with the present invention. Grouping comprises the steps of binning 102 and iterative masking 104. Binning 102 comprises the steps of selecting and sorting URLs (step 106) and combining URLs having common specified attributes into bins (step 108). In step 106, each URL in the database is analyzed to determine the contents of specific fields. URLs having similar contents in the specified fields are placed (binned) into common sets or bins of URLs (step 108). All URLs in the database are placed into bins. Each bin has a smaller number of URLs than the number of URLs in the database. Although, it is possible that all URLs in the database are placed into the same bin, it is highly unlikely. As a result of the binning process 102, each bin comprises at least one URL, and the URLs contained in bins comprising a plurality of URLs have at least one common attribute (i.e., same content in specified field(s)). Examples of specified fields include fields indicating artist, linking URL, title, copyright, host URL, duration, bit rate, sampling rate, etc. In an exemplary embodiment of the invention, URLs are binned if they have the same content for the fields indicating host URL and duration. One advantage of binning is that the number of URLs contained in a bin is relatively small compare to the number of URLs contained in the database, thus partitioning the URLs in the database into more manageable sets of URLs.

Selected bins are iteratively masked in step 104. The masking process 104 is performed on URLs on a bin by bin basis. Each field of each URL is compared to a mask. Not all bins require processing by the iterative masking process 104. In an exemplary embodiment of the invention, bins containing only a single URL are not iteratively masked 104, and bins containing a plurality of URLs are processed in accordance with the iterative masking process 104.

Figure 9:
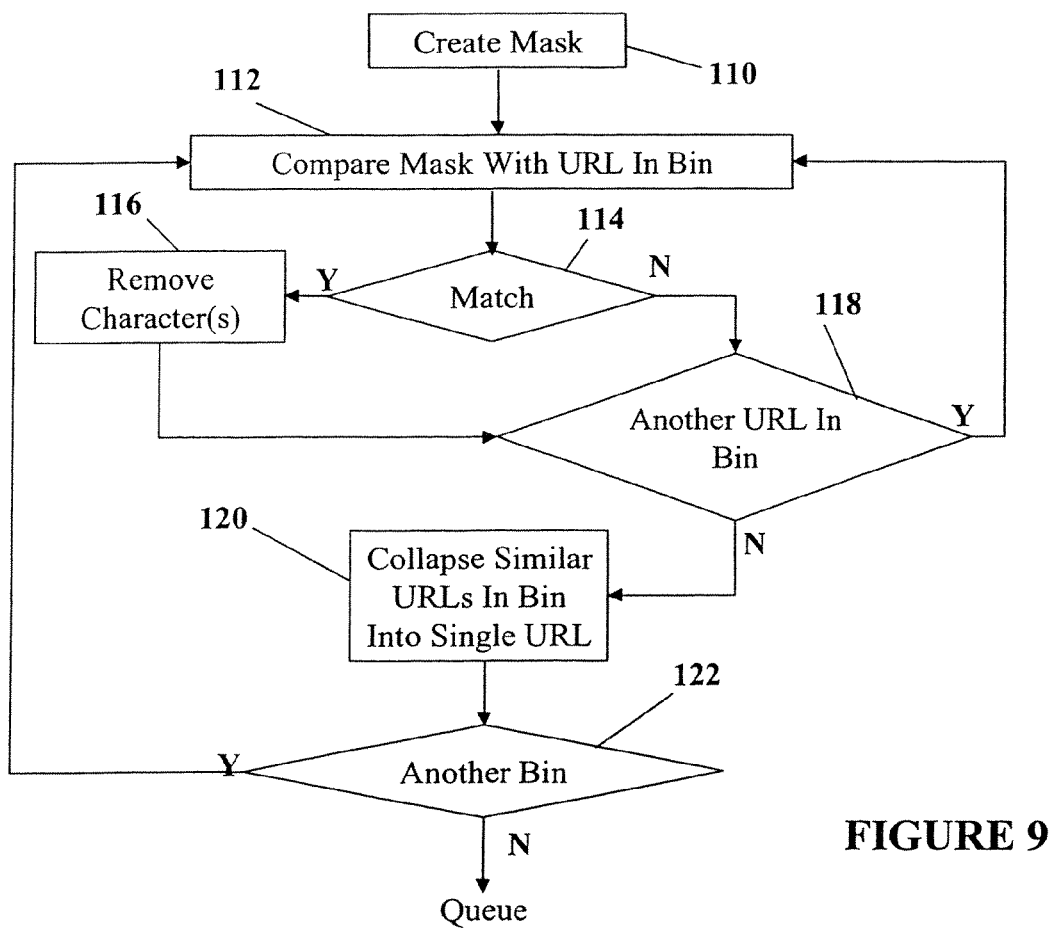
FIG. 9 is a flow diagram of an exemplary iterative masking process in accordance with the present invention.

FIG. 9 is a flow diagram of an exemplary iterative masking process in accordance with the present invention. Iterative masking (step 104) comprises creating a "mask" (step 110) and comparing the mask with each URL in a bin (step 112). A mask comprises at least one character to be removed from the contents of a field within a URL. In an exemplary embodiment of the invention, a mask is a string of characters. For example, a mask may comprise a string of characters pertaining to bit rate of the streaming media content, formatting of the streaming media, or any related characteristic. The mask is compared to each field in a URL in a bin, in step 112. It is determined if any of the characters in the mask match characters in the URL (step 114). If a match exists, the matching character, or characters, is removed from the URL (step 116), otherwise the URL is unchanged. This process is repeated until all URLs in the bin have been compared with the mask (step 118).

Resultant URLs (i.e., URLs that have been compared to the mask) in the bin are compared and collapsed into a single URL if they are the same (step 120). For example, if four URLs differ only by bit rate, and the bit rate of each URL is masked out, the resulting four URLs are collapsed into a single URL. If more bins have been selected, the iterative masking process is repeated for the next bin (step 122) starting at step 112. Grouped URLs are queued and available for all agents.

For example, assume all URLs in the database have been binned such that all URLs comprising the same referring URL are binned together. Thus, assume the following URLs are in the same bin.

http://foo.bar.com/video/someArtist/myVideo__28.ram
    http://foo.bar.com/video/someArtist/myVideo__56.ram
    http://blatz.com/56/someArtist/yourVideo.ram
    http://blatz.com/28/someArtist/yourVideo.ram Further assume that the mask is a string of characters related to bit rate including 28, 56, and 100. Applying this mask to the above URLs and removing the matched characters results in the following URLs.

http://foo.bar.com/video/someArtist/myVideo_.ram
    http://foo.bar.com/video/someArtist/myVideo_.ram
    http://blatz.com//someArtist/yourVideo.ram
    http://blatz.com//someArtist/yourVideo.ram Instead of the bin containing four unique URLs, the bin now contains two copies each of two unique URLs. Each of the two copies is collapsed into a single URL, resulting in the following URLs.

http://foo.bar.com/video/someArtist/myVideo_ram
    http://blatz.com//someArtist/yourVideo.ram Referring again to FIG. 3, metadata quality improver 78 dequeues entries in time and priority order. Metadata quality improver 78 enhances metadata by adding fields of metadata based upon the contents of the fields in the URL of the media file and the contents of the fields in the URL of the referring Web page. The media file is then searchable under the subject heading of the added metadata. For example, a streaming media file may have a referring Web page at www.cnn.com. The metadata quality improver 78 adds the term "news" to the metadata associated with the streaming media file, because cnn is related to news. As a result, the streaming media file is now searchable under the subject heading of "news". Expert based rules are used to associate field contents with metadata. Metadata quality improver 78 applies rules to eliminate duplicate URLs that point to the same data, rules to collect variants of media files with the same content but different encodings or formats (e.g., for multimedia and streaming media), and rules to update metadata fields using prefix URL associations. The metadata quality improvement process comprises prefix rule evaluation, genre annotation, and MUZE® (a commercial database containing metadata about music including song title, music author, and album information) annotation.

Figure 10:
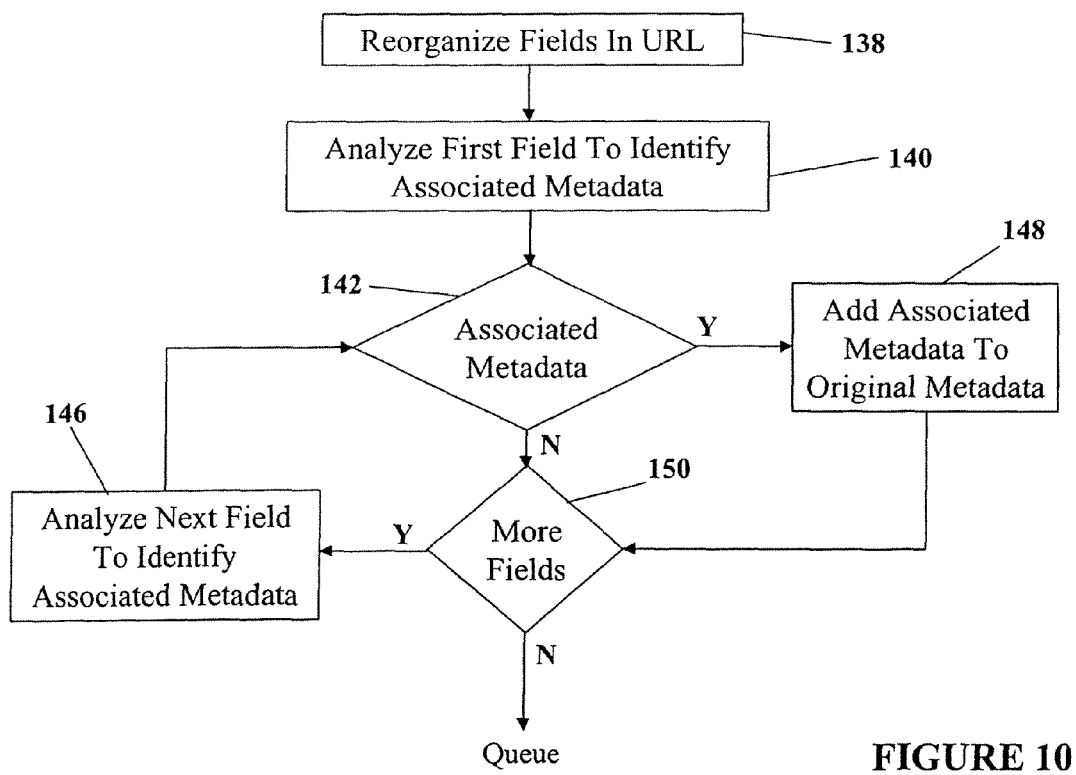
FIG. 10 is a flow diagram of an exemplary metadata quality improvement process in accordance with the present invention.

FIG. 10 is a flow diagram of an exemplary metadata quality improvement process comprising prefix rule evaluation, genre annotation, and MUZE® annotation in accordance with the present invention. Prefix rule evaluation comprises reorganizing the fields in the media URL and determining if an association exists between known sets of metadata and the first field content. Genre annotation comprises updating the genre metadata to ensure proper formatting. MUZE® annotation comprises editing fields of the metadata to improve the quality of other fields of the metadata.

The fields of the URL are reorganized in step 138. In an exemplary embodiment of the invention, the URL is reorganized in reverse order. Thus the first field of the URL becomes the last field and the last field becomes the first. In many instances, this results in a reorganized URL having its most specific field first and its least specific field last. In many instances, this also results in the first set of contiguous fields (i.e., prefix) of the reorganized URL having associated metadata. The first field of the reorganized URL is analyzed to determine if an association exists between the first field and predetermined sets of metadata (step 140). Predetermined sets of metadata may comprise metadata obtained from other fields in the metadata and/or terms (metadata) contained in a database of terms. If it is determined that an association exists (step 142), the associated metadata are added to the original metadata in step 148. After metadata are added, it is determined if the reorganized URL contains more fields (which have not been analyzed for associated metadata) in step 150. If no associated metadata are identified (step 140 and 142), it is also deter mined if more fields exist (step 150). If more fields exist, the next field is analyzed to determine if an association exists between the next field and the predetermined sets of metadata (step 146). In an exemplary embodiment of the invention, the next field is the next contiguous field. If no associated metadata are identified (step 142), no new metadata are added to the metadata associated with the media file. If associated metadata are identified, the associated metadata are added to the original metadata in step 148. This process is continued until all the fields in the reorganized URL have been analyzed. At this point, metadata associated with the longest match (i.e., the greatest number of fields having associated metadata) have been added to the original metadata. Databases are updated with the newly added metadata, and the associated ids are queued and available to all agents.

In an exemplary embodiment of the invention, the genre metadata if updated to ensure proper formatting and correctness. The updated metadata is analyzed to determine if the genre field(s) are correct. If it is determined that the genre field(s) are not correct, they are updated. The genre fields are updated in accordance with predetermined association rules. For example, assume the contents of a field pertaining to category is "music" (i.e., "category=music"). The metadata is analyzed, and the metadata terms "artist=Freddy Roulette", "genre_MP3=punk rock" are found. The field associated with category will be changed from music to punk rock, resulting in "category=punk rock". In this example, the category field is changed because a predetermined association rule is encoded to change the "category" field to the same as the "genre_MP3" field.

In another exemplary embodiment of the invention, the iterative process is halted after metadata associated with the longest prefix of contiguous fields of the reorganized URL are identified, and metadata associated with the prefix, and not the individual fields is added to the original metadata. For example, assuming a URL has ten fields, if the first four fields of the reorganized URL have associated metadata, and the fifth field does not have associated metadata, the sixth through the tenth fields are not analyzed for associated metadata. In this example, the metadata associated with the first four fields, i.e., the prefix, and not the individual fields, (and, as will be explained herein with reference to muze annotation, possibly the metadata associated with the fifth field) are added to the original metadata.

Metadata is added to the metadata associated with the media file. Added metadata may comprise metadata corresponding to category, title, delivery mode, publisher, performer, program title, creation country, and language, for example. The added metadata may be in the form of textual data (e.g., new terms) and/or URLs (e.g., new links). Also, in accordance with the MUZE® annotation rule, added metadata may comprise the content of the field in the reorganized URL that is next to the matching prefix (e.g., first non-matching field). The content of the field is edited to replace connecting characters with spaces, and then added as new metadata. Connecting characters may include, for example, period ("."), underscore ("_"), backslash ("\"), forward slash ("/"), comma (","), asterisk ("*"), hyphen ("-"), and/or any other appropriate connecting character. This muze annotation rule is advantageous for URLs comprising field content of "MP3". In an exemplary embodiment of the invention, all reorganized URLs beginning with the prefix "com.MP3.downloads" are categorized as music and the recommended title (i.e., song title) is based on the filename as given in the field next to the matched prefix. For example, assume the following reorganized URL, "com.MP3.downloads/Freddy Roulette/Laundry_Mat_Blues". In this example, Freddy Roulette is the content of the artist field and Laundry_Mat_Blues is the content of the title field. The metadata quality improvement process finds a match for the prefix of the reorganized URL ending with Freddy Roulette. Because the reorganized URL begins with com.MP3, the metadata quality improver 78 edits the next field (i.e., Laundry_Mat_Blues) after the matched prefix and adds the edited data as the recommended title of the song. The edited field content has no underscores. Thus the resultant added metadata in this example is "Laundry Mat Blues". Databases are updated with the newly added metadata, and the associated ids are queued and available to all agents. Examples of the types of metadata that are added to matched fields are shown in the following table.

| Field Prefix | Added Metadata |
|---|---|
| org.npr.www/ramfiles/atc | Category: Radio<br>Delivery Mode: Broadcast<br>Publisher: NPR<br>Performer: Noah Adams<br>Program Title: All Things Considered<br>Language: English |
| com.sportsline.www/u/audio/basketball/nba | Category: Sports<br>Genre: Basketball<br>Creation Country: US<br>Language: English |
| com.msnbc.www | Category: News<br>Recommended Title: Referring Page Title |
| com.mp3 | Category: Music |
| com.mp3.downloads | Category: Music<br>Recommended Title: Filename in the next field of the URL (i.e., text after the matched prefix) |

Figure 11:
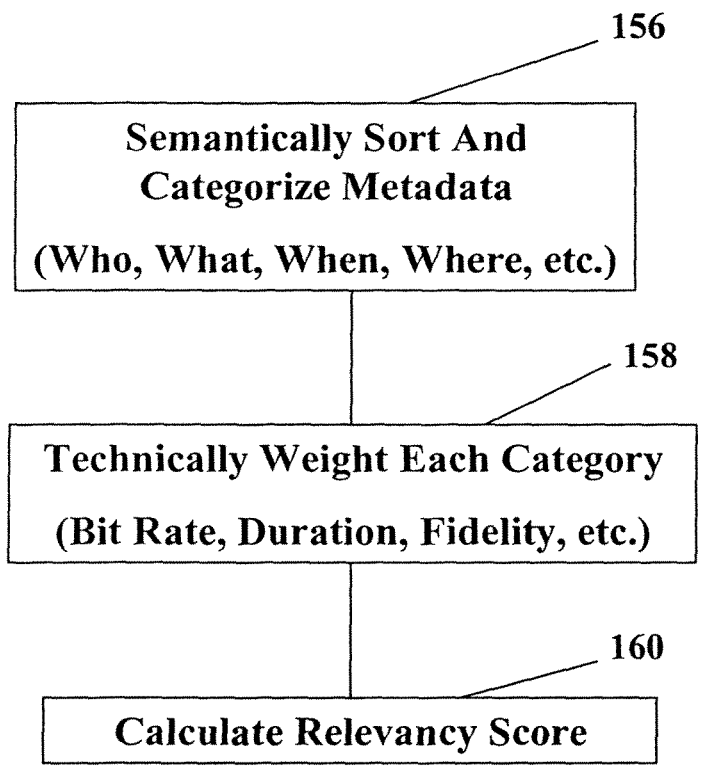
FIG. 11 is a flow diagram of an exemplary full-text relevancy ranking process in accordance with the present invention.

The full-text relevancy ranker 80 comprises ranking and sorting data (e.g., media metadata) based on a variety of semantic and technical data fields (e.g., title, author, date, duration, bit rate, etc.). Full-text relevancy ranker 80 is depicted as part of the work flow architecture of system 300. This depiction is exemplary. In another embodiment of the invention, full-text relevancy ranker 80 is not part of the workflow architecture. The option to include full-text relevancy ranker 80 as part of the workflow architecture (or not) is depicted by the dashed arrows in FIG. 3 (from metadata quality improver 78 to full-text relevancy ranker 80, from full-text relevancy ranker 80 to promoter 82, and from metadata quality improver 78 to promoter 82). FIG. 11 is a flow diagram of an exemplary full-text relevancy ranking process in accordance with the present invention. Media metadata describing the semantics of the content are sorted and grouped into broad categories (e.g., who, what, where, when) in step 156. For example, artist of a streaming media file, type of streaming media, date the streaming media was created, and creation location of the streaming media. These broad categories are individually weighted along with technical parameters such as bit rate, duration, fidelity (audio sampling rate), etc., in step 158. A relevance score is calculated for each URL in accordance with associated weights in step 160. The relevancy score is based upon several weighting criteria, such as the number of times a query term occurs in the metadata (term frequency), the number of links to the referenced Web site, number of terms between query terms in the text for the metadata, and the file type selected for a search (e.g., way, MP3, ram, wma).

For example, suppose a user enters a search query comprising the terms "Mozart", "Magic Flute", and "Red". The full-text relevancy ranker 80, knowing that Mozart is a name of a composer (encoded rule), semantically associates Mozart with the who category and looks for "Mozart" in a field designated as WhoCreation. Magic Flute is recognized as a music composition and is semantically associated with the What category and looked for in the Title field. Weights of greater value are assigned to terms that are associated with semantic categories than to terms that are not associated with semantic categories. Thus, matches to "Mozart" and "Magic Flute" are assigned a greater weight, and accordingly a higher relevancy score, than the unrelated term "Red". The full-text relevancy ranker 80 also considers technical parameters in the calculation of the relevancy score. In the current example, if the term news were added to the search query, the full-text relevancy ranker 80 looks for news pieces about Mozart and the Magic Flute, rather than for a piece of music. In an exemplary embodiment of the invention, full-text relevancy ranker 80 searches for news articles by considering the duration of the indexed files. For example, the full-text relevancy ranker 80 knows that news pieces typically have a shorter duration than music files (an encoded rule). Accordingly, the full-text relevancy ranker 80 assigns a higher score to files with shorter lengths. If full-text ranker 80 is incorporated as part of the workflow architecture, the database is updated with the full-text relevancy ranked data and the associated ids are queued and available to all agents. If full-text relevancy ranker 80 is not incorporated as part of the workflow architecture, no associated ids are queued and made available to all agents. Rather, the results are made directly available to search systems and/or users.

Referring again to FIG. 3, the Promoter 82, formats and prioritizes data for a target search system (e.g., search engine). Promoter 82 adds, deletes, and/or updates the data (including metadata) associated with a media file in accordance with the requirements of the target search system. Promoter 82 also provides an indication to the search system of the trustworthiness of the media data. In an exemplary embodiment of the system, trustworthiness is determined in accordance with predetermined encoded rules. For example, promoter 82 may determine that metadata associated with the title fields is the most trustworthy, and that metadata associated with the genre fields is less trustworthy. This hierarchy of trustworthiness is provided to the target search system in a compatible format. The target search system may then use this hierarchy of trustworthiness to conduct its search or pass the URLs on to the user.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

The present invention may be embodied to update or replace the metadata relating to a media file, contained in a database, web page, storage device, media file (header or footer), URI, transport stream, electronic program guide, and other sources of metadata, by using the same processes and/or apparatuses described wherein.

Although the present invention is described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer-implemented method for enhancing metadata, the method comprising:
    extracting metadata from a source other than a ground truth database, the extracted metadata being related to a media file;
    identifying, in the ground truth database, valid metadata that at least partially matches the extracted metadata, the valid metadata being stored in the ground truth database before the extracted metadata is extracted from the source; and
    generating enhanced metadata by modifying, with a processor, the extracted metadata using at least a portion of the valid metadata by:
        comparing contents in the extracted metadata with corresponding contents in the valid metadata;
        identifying contents in the valid metadata that are not in the extracted metadata; and
        adding the identified contents in the valid metadata to the extracted metadata.

2. The computer-implemented method of claim 1, wherein identifying the valid metadata comprises:
    calculating a score based on a degree of similarity between the extracted metadata and the valid metadata; and
    determining that the valid metadata at least partially matches the extracted metadata based on the score.

3. The computer-implemented method of claim 1, wherein generating the enhanced metadata comprises:
    comparing contents in the extracted metadata with corresponding contents in the valid metadata;
    identifying contents in the valid metadata that do not match contents in the extracted metadata; and
    replacing the non-matching contents in the extracted metadata with the identified contents in the valid metadata.

4. The computer-implemented method of claim 1, wherein the source includes at least one of the media file, a web page, a uniform resource locator, a transport stream, a link, a multipurpose internet mail extension, a program, a file, a storage, a database, an index, and a user.

5. The computer-implemented method of claim 1, further comprising:
    searching for the media file based on the enhanced metadata.

6. The computer-implemented method of claim 1, further comprising:
    updating an index of the media file based on the enhanced metadata.

7. The computer-implemented method of claim 1, further comprising:
    storing the enhanced metadata in association with the media file.

8. The computer-implemented method of claim 1, wherein generating the enhanced metadata comprises:
    identifying within the extracted metadata an empty metadata field; and
    filling the empty metadata field with metadata from an other source.

9. A system for enhancing metadata, comprising:
    a storage for storing instructions;
    a processor for executing the instructions to perform the steps of:
        extracting metadata from a source other than a ground truth database, the extracted metadata being related to a media file;
        identifying, in the ground truth database, valid metadata that at least partially matches the extracted metadata, the valid metadata being stored in the ground truth database before the extracted metadata is extracted from the source; and
        generating enhanced metadata by modifying the extracted metadata using at least a portion of the valid metadata by:
            comparing contents in the extracted metadata with corresponding contents in the valid metadata;
            identifying contents in the valid metadata that are not in the extracted metadata; and
            adding the identified contents in the valid metadata to the extracted metadata.

10. The system of claim 9, wherein identifying the valid metadata comprises:
    calculating a score based on a degree of similarity between the extracted metadata and the valid metadata; and
    determining that the valid metadata at least partially matches the extracted metadata based on the score.

11. The system of claim 9, wherein generating the enhanced metadata comprises:
    comparing contents in the extracted metadata with corresponding contents in the valid metadata;
    identifying contents in the valid metadata that do not match contents in the extracted metadata; and
    replacing the non-matching contents in the extracted metadata with the identified contents in the valid metadata.

12. The system of claim 9, wherein the source includes at least one of the media file, a web page, a uniform resource locator, a transport stream, a link, a multipurpose internet mail extension, a program, a file, a storage, a database, an index, and a user.

13. The system of claim 9, further comprising instructions for:
    searching for the media file based on the enhanced metadata.

14. The system of claim 9, further comprising instructions for:
    updating an index of the media file based on the enhanced metadata.

15. The system of claim 9, further comprising instructions for:
    storing the enhanced metadata in association with the media file.

16. A computer-usable storage device tangibly storing instructions which, when executed by a processor, perform a method for enhancing metadata, the method comprising:

extracting metadata from a source other than a ground truth database, the extracted metadata being related to a media file;

identifying, in the ground truth database, valid metadata that at least partially matches the extracted metadata, the valid metadata being stored in the ground truth database before the extracted metadata is extracted from the source; and generating enhanced metadata by modifying the extracted metadata using at least a portion of the valid metadata by:
    comparing contents in the extracted metadata with corresponding contents in the valid metadata;
    identifying contents in the valid metadata that are not in the extracted metadata; and
    adding the identified contents in the valid metadata to the extracted metadata.

17. The computer-usable storage device of claim 16, wherein identifying the valid metadata comprises:
    calculating a score based on a degree of similarity between the extracted metadata and the valid metadata; and
    determining that the valid metadata at least partially matches the extracted metadata based on the score.

18. The computer-usable storage device of claim 16, wherein generating the enhanced metadata comprises:
    comparing contents in the extracted metadata with corresponding contents in the valid metadata;
    identifying contents in the valid metadata that do not match contents in the extracted metadata; and
    replacing the non-matching contents in the extracted metadata with the identified contents in the valid metadata.

19. The computer-usable storage device of claim 16, wherein the source includes at least one of the media file, a web page, a uniform resource locator, a transport stream, a link, a multipurpose internet mail extension, a program, a file, a storage, a database, an index, and a user.

20. The computer-usable storage device of claim 16, further storing instructions for:
    searching for the media file based on the enhanced metadata.

21. The computer-usable storage device of claim 16, further storing instructions for:
    updating an index of the media file based on the enhanced metadata.

22. The computer readable storage medium-computer-usable storage device of claim 16, further storing instructions for:
    storing the enhanced metadata in association with the media file.

* * * * *